(12) United States Patent
Takeshita et al.

(10) Patent No.: US 9,550,427 B2
(45) Date of Patent: Jan. 24, 2017

(54) CONTACTLESS POWER SUPPLY DEVICE

(75) Inventors: Toyoaki Takeshita, Hyogo (JP); Kazuo Kimura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 233 days.

(21) Appl. No.: 13/824,900

(22) PCT Filed: Mar. 30, 2011

(86) PCT No.: PCT/JP2011/001885
§ 371 (c)(1),
(2), (4) Date: Mar. 18, 2013

(87) PCT Pub. No.: WO2012/039077
PCT Pub. Date: Mar. 29, 2012

(65) Prior Publication Data
US 2013/0181667 A1 Jul. 18, 2013

(30) Foreign Application Priority Data

Sep. 21, 2010 (JP) .................................. 2010-210878
Sep. 21, 2010 (JP) .................................. 2010-210879

(51) Int. Cl.
*H02J 7/00* (2006.01)
*B60L 11/18* (2006.01)
(Continued)

(52) U.S. Cl.
CPC ............. *B60L 11/182* (2013.01); *B60M 7/003* (2013.01); *H01F 27/02* (2013.01); *H01F 27/025* (2013.01);
(Continued)

(58) Field of Classification Search
USPC ........................................................ 320/108
See application file for complete search history.

(56) References Cited

U.S. PATENT DOCUMENTS 4,800,328 A * 1/1989 Bolger et al. ................. 320/106
5,821,731 A * 10/1998 Kuki et al. .................... 320/108
(Continued)

FOREIGN PATENT DOCUMENTS

JP 59-059452 U 4/1984
JP 59-59452 U 4/1984
(Continued)

OTHER PUBLICATIONS

Machine translation of JP 2009-004513.*
(Continued)

*Primary Examiner* — Samuel Berhanu
(74) *Attorney, Agent, or Firm* — McDermott Will & Emery LLP

(57) ABSTRACT

A contactless power supply device supplying electric power in a contactless manner to a power receiving device mounted on a moving object includes: a bottom plate structuring an installation face; a power transmitting coil disposed on the bottom plate to supply electric power to a power receiving coil included in the power receiving device; and a cover attached to the bottom plate so as to cover the power transmitting coil disposed on the bottom plate. A layer of air is formed between the power transmitting coil and the cover.

16 Claims, 6 Drawing Sheets

(51) Int. Cl.
*B60M 7/00* (2006.01)
*H01F 27/02* (2006.01)
*H01F 38/14* (2006.01)
*H04B 5/00* (2006.01)

(52) U.S. Cl.
CPC ............ *H01F 38/14* (2013.01); *H04B 5/0037* (2013.01); *H04B 5/0075* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS 6,409,551 B1 * 6/2002 Nagai ........................... 439/701
6,499,621 B1    12/2002 Yamaguchi et al.

FOREIGN PATENT DOCUMENTS

| JP | 04163077 A * | 6/1992 |
| JP | 2001-009914 A | 1/2001 |
| JP | 2003-046270 A | 2/2003 |
| JP | 2008-087733 A | 4/2008 |
| JP | 2009-004513 A | 1/2009 |
| JP | 2009-005469 A | 1/2009 |
| JP | 2009-188076 A | 8/2009 |
| WO | WO-2009/031639 A1 | 3/2009 |

OTHER PUBLICATIONS

Translation of JP 57-047254; Ohara et al.*
Machine translation of JP 2009-005469 A.*
Machine Translation of JP04163077.*
International Search Report issued in International Patent Application No. PCT/JP2011/001885 mailed on Jul. 5, 2011.
International Preliminary Report on Patentability, and its English translation thereof, issued in International Patent Application No. PCT/JP2011/001885 mailed on Apr. 4, 2013.
Japanese Office Action issued in Japanese Application No. 2012-534905, dated Mar. 17, 2015.

* cited by examiner

CONTACTLESS POWER SUPPLY DEVICE

RELATED APPLICATIONS

This application is the U.S. National Phase under 35 U.S.C. §371 of International Application No. PCT/JP2011/001885, filed on Mar. 30, 2011, which in turn claims the benefit of Japanese Application No. 2010-210878, filed on Sep. 21, 2010, and Japanese Application No. 2010-210879, filed on Sep. 21, 2010, the disclosures of which Applications are incorporated by reference herein.

TECHNICAL FIELD

The present invention relates to a contactless power supply device that supplies electric power in a contactless manner from a built-in primary coil to a secondary coil mounted in an electrically propelled vehicle such as an electric vehicle or a hybrid vehicle, for example.

BACKGROUND ART

FIG. 6 is a schematic diagram showing the structure of a conventional contactless power supply device 6. In FIG. 6, a contactless power supply device (primary side) F connected to a power panel of a power supply 9 located on the external ground side is disposed so as to oppose to a power receiving device (secondary side) G mounted on an electrically propelled vehicle, having an air gap, i.e., a clearance space, interposed between the contactless power supply device F and the power receiving device G without any physical contact when power is to be supplied. When a magnetic flux is formed at a primary coil 7 included in the power supply device F in such a disposition state, an induced electromotive force is generated at a secondary coil 8 included in the power receiving device G. Thus, the electric power is transmitted from the primary coil 7 to the secondary coil 8 in a contactless manner.

The power receiving device G is connected to an in-vehicle battery 10, for example, and the in-vehicle battery 10 is charged with the electric power transmitted in the manner as described above. An in-vehicle motor 11 is driven by the electric power stored in the battery 10. Note that, during the contactless power supply process, the power supply device F and the power receiving device G exchange necessary information between each other through a wireless communication device 12, for example.

FIG. 7 is a schematic diagram showing the internal structure of the power supply device F and the power receiving device G. In particular, FIG. 7(a) is a schematic diagram showing the internal structure of the power supply device F as seen from above, or the power receiving device G as seen from below. FIG. 7(b) is a schematic diagram showing the internal structure of the power supply device F or the power receiving device G as seen sideways.

In FIG. 7, the power supply device F includes the primary coil 7, a primary magnetic core 13, a back plate 15, a cover 16 and the like. In simple, the power receiving device G is structured symmetrically to the power supply device F, and includes the secondary coil 8, a secondary magnetic core 14, a back plate 15, a cover 16 and the like. The surface of the primary coil 7 and the primary magnetic core 13, and the surface of the secondary coil 8 and the secondary magnetic core 14 are covered and fixed by a mold resin 17 in which foam materials 18 are contained, respectively.

In other words, both the power supply device F and the power receiving device G are filled with the mold resin 17 between the back plate 15 and the cover 16, and the surface of each of the primary coil 7, the secondary coil 8, furthermore the primary magnetic core 13, and the secondary magnetic core 14 located inside is covered and fixed. The mold resin 17 is made of silicone resin, for example. By fixing the inside, the primary and secondary coils 7 and 8 are positioned and fixed, and the mechanical strength thereof is secured. In addition, the heat dissipation function is exhibited. That is, though the primary and secondary coils 7 and 8 produce heat by Joule heat as an exciting current flows, the heat is dissipated by thermal conduction of the mold resin 17, and the primary and secondary coils 7 and 8 are cooled.

Patent Document(s)

Patent Document 1: JP 2008-87733 A

SUMMARY OF THE INVENTION

Problems to be Solved by the Invention

Meanwhile, in the electrically propelled vehicle application, since great electric power is transmitted from the power supply device F to the power receiving device G, even when the heat dissipation measures are taken using the mold resin 17 as shown in FIG. 7, it is far from satisfactory. There is a problem that Joule heat from the coils 7 and 8 is transferred to each part.

For example, since the power supply device F is used in the state as being shallowly buried in a parking space, or as being placed on the ground, the top face side of the power supply device F (for example, around the cover 16) may possibly be brought into contact with a person.

From the background as described above, it is highly important to take measures against overheat of the cover 16 of the power supply device F attributed to Joule heat.

Further, in other example, the power supply device F includes an electronic component such as a capacitor, in addition to the primary coil 7 and the primary magnetic core 13. Accordingly, it is highly important to take measures against overheat of the electronic component attributed to Joule heat.

The present invention has been made in view of the above problems involved with the conventional technique. An object of the present invention is to provide a contactless power supply device that can reduce transfer of Joule heat from the power transmitting coil to each part (for example, the cover or the electronic components), and that can prevent overheat of each part (for example, the cover or the electronic components).

Means to Solve the Problems

In order to achieve the object stated above, a first aspect of the present invention provides a contactless power supply device supplying electric power in a contactless manner to a power receiving device mounted on a moving object, including: a bottom plate having an installation face; a power transmitting coil that is disposed on the bottom plate to supply electric power to a power receiving coil included in the power receiving device; and a cover attached to the bottom plate so as to cover the power transmitting coil, wherein an air layer is formed between the power transmitting coil and the cover.

A second aspect of the present invention provides a contactless power supply device supplying electric power in a contactless manner to a power receiving device mounted on a moving object, including: a bottom plate having an installation face; a power transmitting coil that is disposed on the bottom plate to supply electric power in the contactless manner to the power receiving device; an electronic component that is disposed on the bottom plate and that is connected to the power transmitting coil; and a cover attached to the bottom plate so as to cover the power transmitting coil and the electronic component, the contactless power supply device further including a partition wall that divides a space surrounded by the bottom plate and the cover into a first storage space storing the power transmitting coil and a second storage space storing the electronic component.

Effects of the Invention

According to the first aspect of the present invention, provision of the air layer exhibiting the heat insulating effect between the power transmitting coil and the cover can suppress Joule heat of the power transmitting coil from being transferred to the cover, which may possibly be touched by a person. Thus, the contactless power supply device being capable of preventing overheat of the cover can be provided.

According to the second aspect of the present invention, since the power transmitting coil and the electronic component are stored in separate spaces which are implemented by the partition wall, Joule heat generated by the power transmitting coil will not easily be transferred to the electronic component. Thus, the contactless power supply device being capable of preventing overheat of the electronic component can be provided.

DESCRIPTION OF EMBODIMENTS

Figure 1:
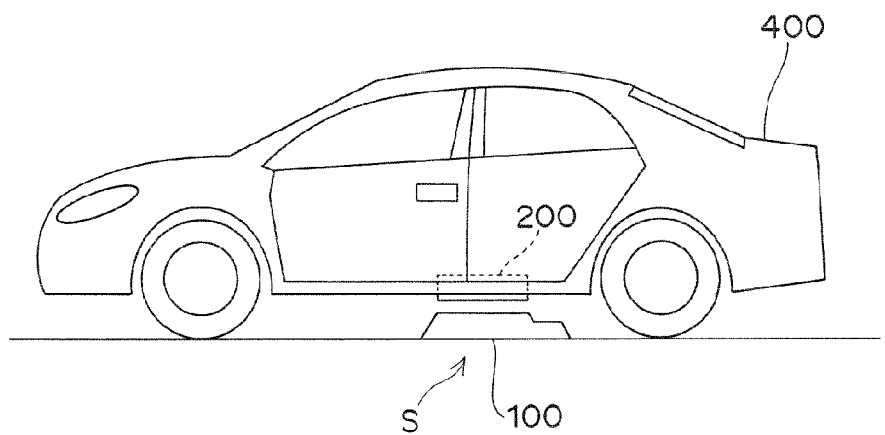
FIG. 1 is a schematic diagram showing an installation example of a contactless power supply system including a contactless power supply device of the present invention.

The first aspect of the present invention provides a contactless power supply device supplying electric power in a contactless manner to a power receiving device mounted on a moving object, including: a bottom plate having an installation face; a power transmitting coil that is disposed on the bottom plate to supply electric power to a power receiving coil included in the power receiving device; and a cover attached to the bottom plate so as to cover the power transmitting coil, wherein an air layer is formed between the power transmitting coil and the cover.

The air layer exhibiting the heat insulating effect provided between the power transmitting coil and the cover acts on the cover, which may possibly be touched by a person, to reduce transfer of Joule heat from the power transmitting coil. Thus, overheat of the cover can be prevented.

Further, provision of a thermally conductive member being higher in thermal conductivity than air between the bottom plate and the power transmitting coil makes it possible to release Joule heat from the power transmitting coil to the outside via the thermally conductive member.

Preferably, the thermally conductive member is made of ceramic or resin.

Allowing a thermally insulating member lower in thermal conductivity than air to be interposed the air layer between the power transmitting coil and the cover, it becomes possible to further reduce transfer of Joule heat from the power transmitting coil to the cover.

The moving object is representatively an electrically propelled vehicle.

The contactless power supply device further includes an electronic component that is disposed on the bottom plate and that is connected to the power transmitting coil. Here, the cover further covers the electronic component. Moreover, the contactless power supply device further includes a partition wall that divides a space surrounded by the bottom plate and the cover into a first storage space storing the power transmitting coil and a second storage space storing the electronic component.

The second storage space is provided to one of the front direction and the rear direction of the moving object with reference to the first storage space.

The height of the first storage space with reference to the bottom plate and the height of the second storage space with reference to the bottom plate are different from each other.

The partition wall is integrally formed with the cover so as to extend from the cover to the bottom plate, the partition wall possessing a thermal insulating characteristic.

The partition wall has a notch. The contactless power supply device further includes a thermally insulating member that fits with the notch and that has a plurality of through holes. Into the through holes, a lead wire connected to one end of the power transmitting coil and a lead wire connected to other end of the power transmitting coil are inserted.

The second aspect of the present invention provides a contactless power supply device supplying electric power in a contactless manner to a power receiving device mounted on a moving object, including: a bottom plate having an installation face; a power transmitting coil that is disposed on the bottom plate to supply electric power in the contactless manner to the power receiving device; an electronic component that is disposed on the bottom plate and that is connected to the power transmitting coil; and a cover attached to the bottom plate so as to cover the power transmitting coil and the electronic component, the contactless power supply device further including a partition wall that divides a space surrounded by the bottom plate and the cover into a first storage space storing the power transmitting coil and a second storage space storing the electronic component.

With this structure, Joule heat generated by the power transmitting coil will not easily be transferred to the electronic component. Thus, overheat of the electronic component can be prevented.

Further, the second storage space is provided to one of the front direction and the rear direction of the moving object with reference to the first storage space.

Still further, since the height of the first storage space with reference to the bottom plate and the height of the second storage space with reference to the bottom plate are different from each other, the front side and back side of the contactless power supply device (i.e., orientation) can instantaneously be discerned between each other. Thus, the contactless power supply device can be attached with ease.

Still further, the partition wall is integrally formed with the cover so as to extend from the cover to the bottom plate, and the partition wall possesses the thermal insulating characteristic. Therefore, Joule heat generated by the power transmitting coil will not easily be transferred to the electronic component, and overheat of the electronic component can be prevented.

Still further, allowing a thermally insulating member having a plurality of through holes to be fitted with the notch formed at the partition wall, and allowing a lead wire connected to one end of the power transmitting coil and a lead wire connected to other end of the power transmitting coil to be inserted into the through holes, the lead wires can be arranged with ease.

In the following, with reference to the drawings, a description will be given of embodiment of the present invention.

FIG. 1 is a schematic diagram showing an installation example of a contactless power supply system S including a contactless power supply device 100 according to the present invention. In FIG. 1, the contactless power supply system S is structured with a contactless power supply device (hereinafter simply referred to as the "power supply device") 100 disposed at a prescribed place on the ground, and a power receiving device 200 installed on a moving object side. The contactless power supply system S is representatively used for charging an electrically propelled vehicle 400, for example. In this case, the power receiving device 200 is installed in the electrically propelled vehicle 400 as a moving object, and the power supply device 100 is representatively placed on the ground. However, the present invention is not limited thereto, and the power supply device 100 may shallowly be buried in a parking space, or it may be movably structured.

Note that the present invention is mainly applied to the power supply device. Accordingly, in the following description, the description of the power receiving device will be given only when it is particularly necessary.

Figure 2:
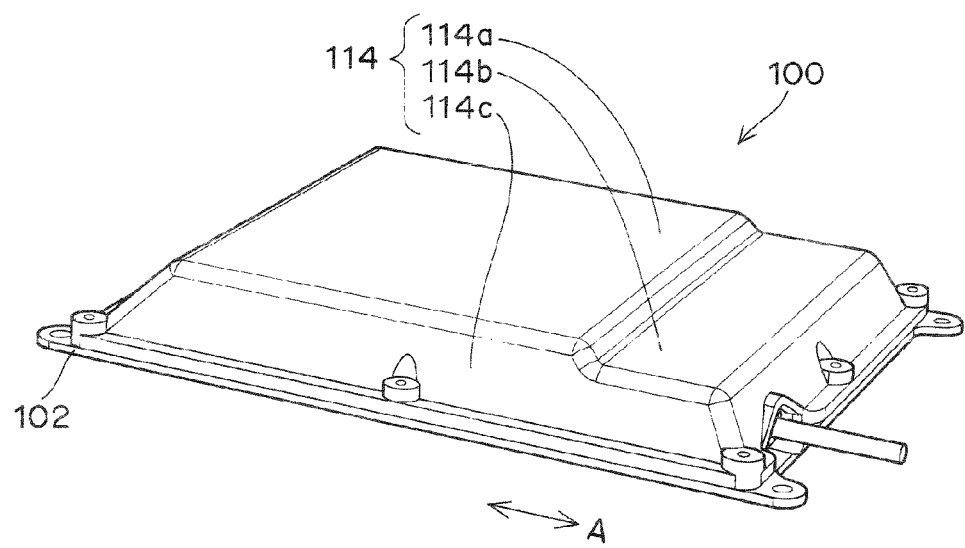
FIG. 2 is an exterior perspective view of the contactless power supply device shown in FIG. 1.
Figure 3:
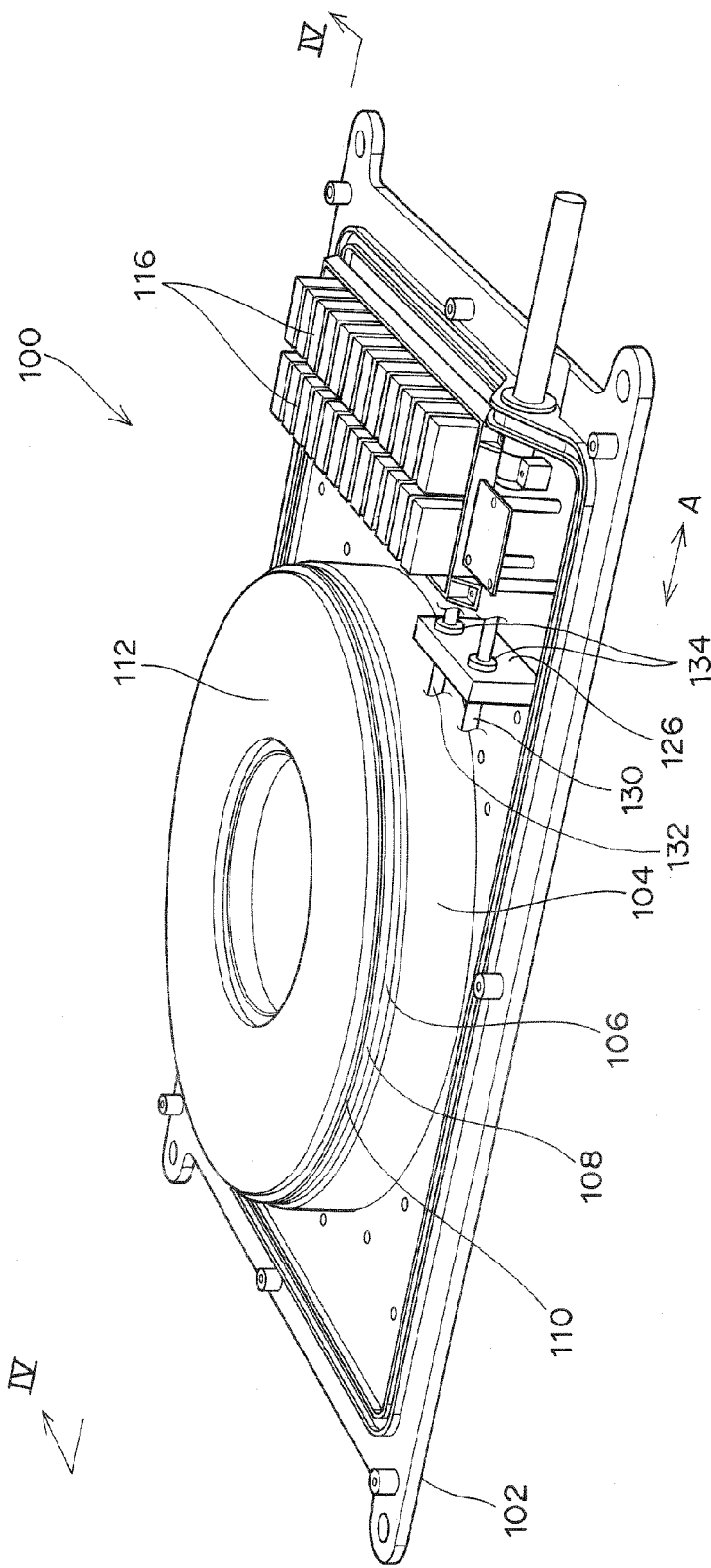
FIG. 3 is a perspective view showing an internal structure of the contactless power supply device shown in FIG. 2.

FIG. 2 is an exterior perspective view of the power supply device 100 shown in FIG. 1. FIG. 3 shows the internal structure of the power supply device 100 shown in FIG. 2, being a perspective view in which a cover 114 shown in FIG. 2 is removed. Further, FIG. 4 is a vertical cross-sectional view of the power supply device 100 taken along line IV-IV shown in FIG. 3.

Figure 4:
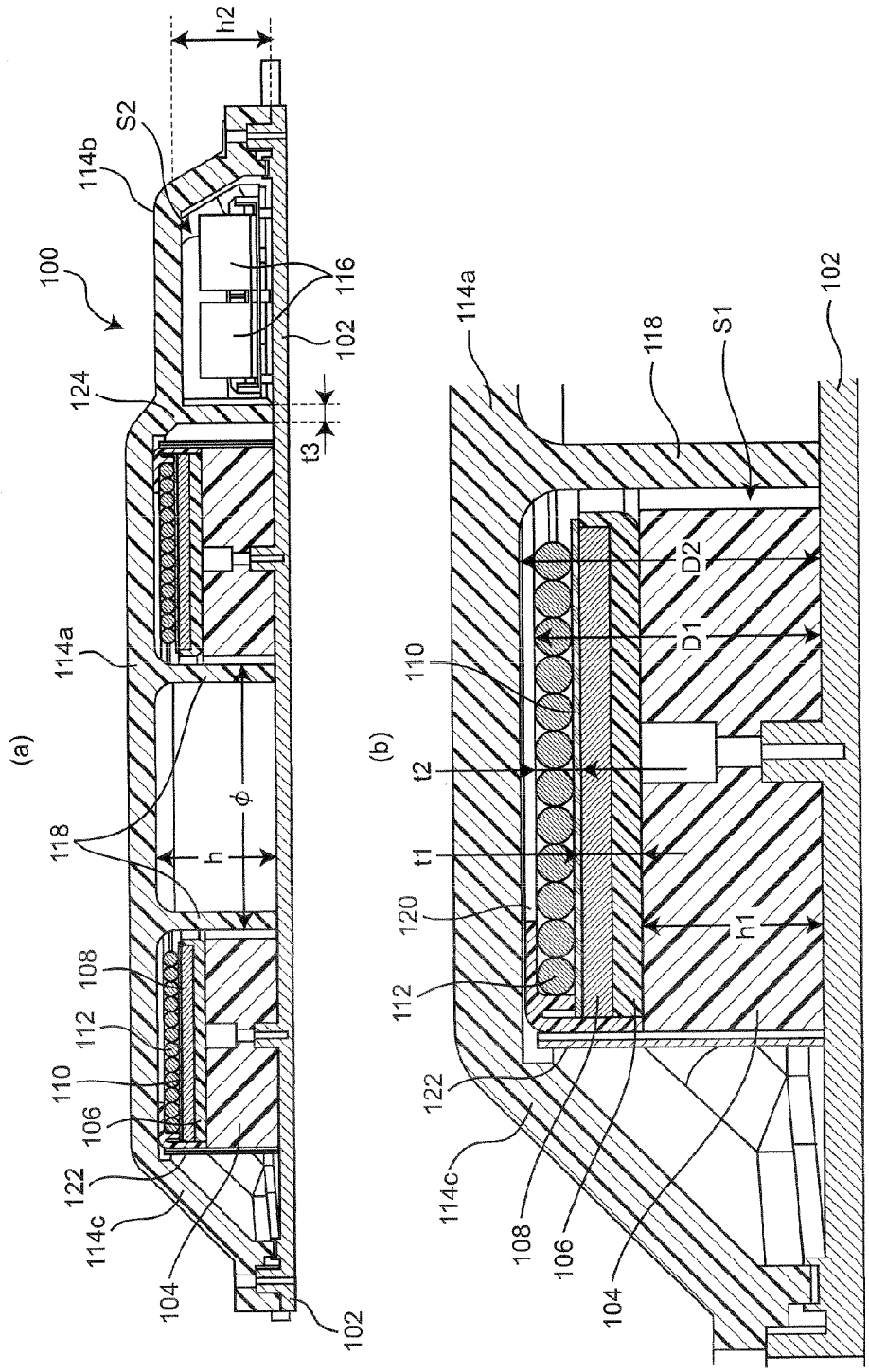
FIG. 4 is a vertical cross-sectional view of the contactless power supply device taken along line IV-IV in FIG. 3.

As shown in FIGS. 2 to 4, the power supply device 100 includes a thermally conductive member 104, a coil base 106, a ferrite 108, a mica plate 110, and a power transmitting coil 112, which are successively placed and fixed on a bottom plate 102, and an electronic component group 116 being placed and fixed on the bottom plate 102 at the position being away from the foregoing components. The thermally conductive member 104, the coil base 106, the ferrite 108, the mica plate 110, the power transmitting coil 112, and the electronic component group 116 are covered by the cover 114.

The bottom plate 102 is made of aluminum, for example. The bottom plate 102 is substantially rectangular, and the bottom face of which is the installation face.

Further, the cover 114 is provided with a dividing wall 118. The dividing wall 118 has an annular (sleeve-like) shape, whose outer diameter is $\phi$ and height is h. The dividing wall 118 is integrally molded with the cover 114 so as to protrude downward from the cover 114, and the dimension is set such that the bottom end of the dividing wall 118 just reaches the bottom plate 102. Thus, the strength against the load (e.g., the weight of a person) that may be applied to the cover 114 from above is secured. The thermally conductive member 104, the coil base 106, the ferrite 108, the mica plate 110, the power transmitting coil 112, and the electronic component group 116 are disposed outside the dividing wall 118.

The thermally conductive member 104 has a substantially annular (sleeve-like) shape, whose inner diameter is slightly greater than the outer diameter $\phi$ of the dividing wall 118, with the prescribed height of h1. Use of an electrically conductive material as the material of the thermally conductive member 104 invites magnetic coupling by the magnetic field formed by the power transmitting coil 112. Then, induced current flow incurs unnecessary heat generation, which results in troubles such as a reduction in power supply efficiency. Accordingly, materials other than metal and electrically conductive materials are employed for the thermally conductive member 104. For example, ceramic or resin containing a filler that improves thermal conductivity is used.

Further, it is preferable that the thermal conductivity of the thermally conductive member 104 is higher than the thermal conductivity of air in a prescribed temperature range (e.g., 150° C. or less). The thermal conductivity is set to 1 W/mK or more, for example. However, it is preferable that the thermal conductivity of the thermally conductive member 104 is as high as possible.

The thermally conductive member 104 is fixed to the bottom plate 102 by, for example, bolts and the like, in the state where the dividing wall 118 is inserted into a through hole formed at the central portion in the radial direction of the thermally conductive member 104. On the thermally conductive member 104, the annular coil base 106 is placed, and the ferrite 108 for collecting magnetic flux is placed on the annular coil base 106.

The coil base 106 and the ferrite 108 each have an annular shape whose inner diameter is substantially slightly greater than the outer diameter $\phi$ of the dividing wall 118, with the thickness of t1. In the state where the dividing wall 118 is inserted into the through hole formed at the central portion in the radial direction of each of the coil base 106 and the ferrite 108, the coil base 106 and the ferrite 108 are disposed on the thermally conductive member 104.

Further, on the ferrite 108, the annular mica plate 110 as an electrical insulating plate is placed. The mica plate 110 has an inner diameter being substantially slightly greater than the outer diameter $\phi$ of the dividing wall 118, and the dividing wall 118 is inserted into the through hole formed at the central portion in the radial direction of the mica plate 110.

The power transmitting coil 112 is wound such that its inner diameter substantially becomes greater than the outer diameter $\phi$ of the dividing wall 118, and has an annular shape whose thickness is t2 (including the thickness of the mica plate 110). Into the hole at the central portion in the radial direction of the power transmitting coil 112, the dividing wall 118 is inserted. Note that, though the power transmitting coil 112 is structured with a copper wire or the like, for the sake of convenience, it is illustrated to be disc-like for example in FIG. 3.

The electronic component group 116 is required for the operation of the power supply device 100 (i.e., the operation for supplying power in a contactless manner to the power receiving device 200), e.g., a capacitor. In the present embodiment, the electronic component group 116 is defined to be lower, particularly, in heat resistance performance than the power transmitting coil 112.

Note that, as shown in FIGS. 2 and 3, the bottom plate 102 is designed such that its long side conforms to the traveling direction (indicated by arrow A) of the electrically propelled vehicle 400. Note that the direction indicated by arrow A corresponds also to the front-back direction of the power supply device 100.

Further, the thermally conductive member 104, the ferrite 108, the power transmitting coil 112 and the like are disposed toward the front side or the back side of the power supply device 100 or the bottom plate 102 as seen from the electronic component group 116. Thus, a space is produced on the back side or front side of the power supply device 100 or the bottom plate 102. In this space, the electronic component group 116 is disposed so as to be away from the power transmitting coil 112 and the like.

As shown in FIG. 4, the thermally conductive member 104, the coil base 106, the ferrite 108, the mica plate 110, and the power transmitting coil 112 successively stacked on the bottom plate 102 are retained by a coil holder 120 made of resin. At a plurality of places on the outer circumferential face of the coil holder 120, projecting portions (not shown) are provided. Through the projecting portions, the coil holder 120 is attached to the bottom plate 102 by bolts and the like.

Note that the thermally conductive member 104, the coil base 106, the ferrite 108, and the mica plate 110 may be fixed to one another by an adhesive agent or the like.

Further, the thermally conductive member 104, the coil base 106, the ferrite 108, the mica plate 110, and the power transmitting coil 112 are surrounded by a cylindrical shield member 122 provided in the outward radial direction thereof. The shield member 122 is made of aluminum, for example. By surrounding the power transmitting coil 112 by the bottom plate 102 and the shield member 122, magnetic leakage from the power transmitting coil 112 downward or sideways is suppressed as much as possible.

The cover 114 is made of resin concrete or FRP (Fiber Reinforced Plastics), and includes a first top wall 114a, a second top wall 114b, and a plurality of side faces 114c that extend from the first top wall 114a and/or the second top wall 114b toward the bottom plate 102 as being tilted. The cover 114 is attached to the bottom plate 102 by bolts and the like, for example.

Accordingly, the first top wall 114a, the second top wall 114b, the plurality of side faces 114c, and the bottom plate 102 of the cover 114 form a space in which the thermally conductive member 104, the coil base 106, the ferrite 108, the mica plate 110, the power transmitting coil 112, and the electronic component group 116 can be stored.

Figure 5:
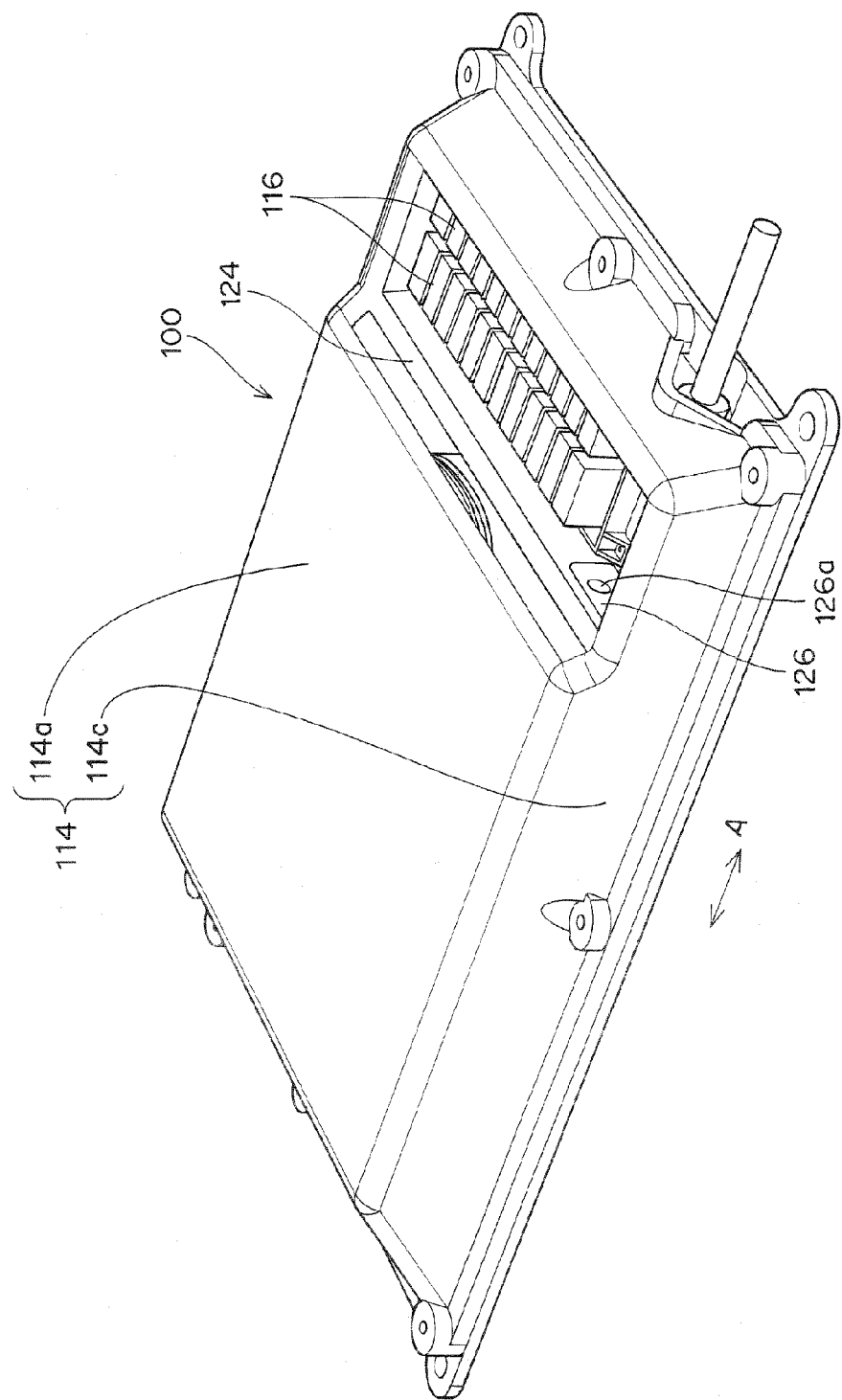
FIG. 5 is an exterior perspective view in which the contactless power supply device shown in FIG. 2 is partially cut out.
Figure 6:
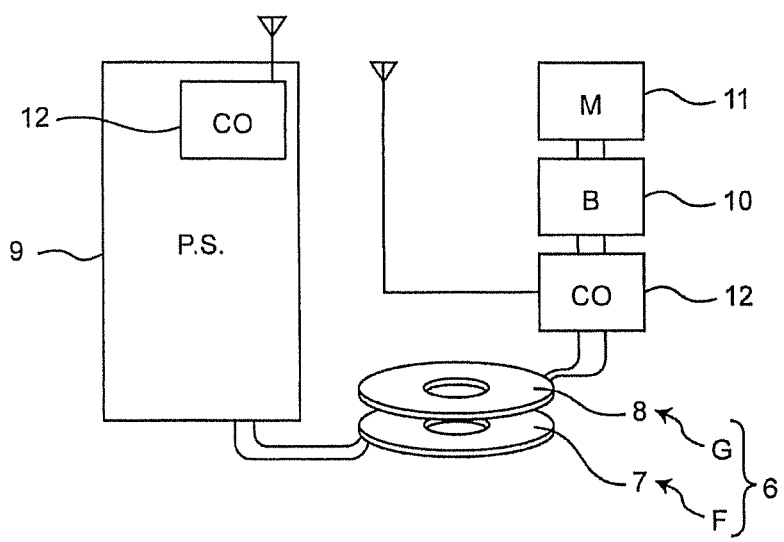
FIG. 6 is a schematic diagram showing the structure of a conventional contactless power supply device.
Figure 7:
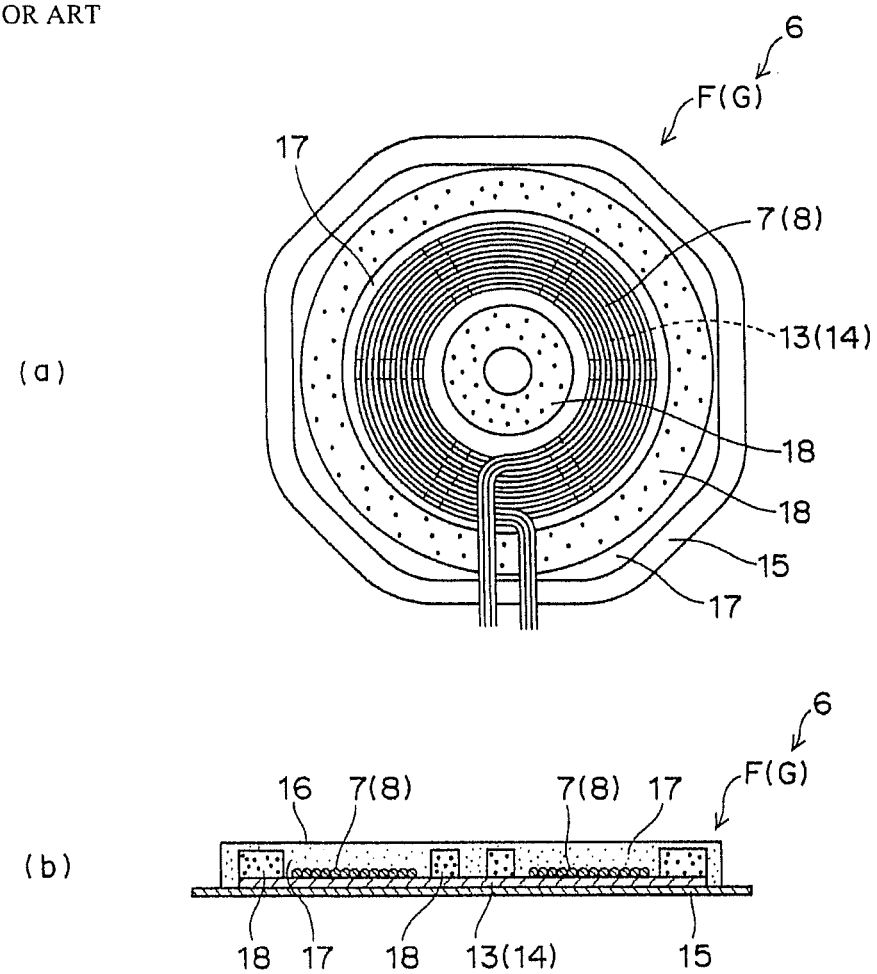
FIG. 7 is a schematic diagram showing the internal structure of the contactless power supply device shown in FIG. 6 and the power receiving device disposed to oppose to the power supply device.

As shown in FIGS. 4 and 5, the cover 114 is provided with a partition wall 124 extending from the connection portion between the first top wall 114a and the second top wall 114b toward the bottom plate 102. The partition wall 124 has a plate-like shape with the prescribed thickness of t3 and the height (maximum value) of h2, and has a thermal insulating characteristic. Further, the partition wall 124 is provided so as to laterally extend (i.e., in the direction of arrow A) across the bottom plate 102, between the power transmitting coil 112 and the electronic component group 116. In the present embodiment, exemplarily, the partition wall 124 is integrally molded with the cover 114.

In particular, as shown in FIGS. 4 and 5, the cover 114 is designed such that the first top wall 114a covers the power transmitting coil 112 from above, and the second top wall 114b covers the electronic component group 116 from above. The partition wall 124 extending downward from the connecting portion between the first top wall 114a and the second top wall 114b has its dimension set such that its bottom end reaches the bottom plate 102. As a result, the space (the space surrounded by the bottom plate 102 and the cover 114) in the cover 114 is divided by the partition wall 124 into a first storage space S1 that stores the power transmitting coil 112 and the like and a second storage space S2 that stores the electronic component group 116. Thus, Joule heat generated by the power transmitting coil 112 is blocked by the partition wall 124 exhibiting the thermal insulation performance, and Joule heat is prevented from being transferred to the electronic component group 116.

Further, as shown in FIGS. 3 and 5, one end of the power transmitting coil 112 is connected to a lead wire 130, and other end of the power transmitting coil 112 is connected to a separate lead wire 132. The lead wire 130 penetrates through one of the sidewalls 114c of the cover 114 and is led to the outside; while the lead wire 132 is connected to the electronic component group 116, and then penetrates one of the sidewalls 114c and is led to the outside, similarly to the lead wire 130.

Accordingly, while the lead wires 130 and 132 must penetrate through the partition wall 124, when the partition wall 124 is integrally molded with the cover 114, the arrangement of the lead wires 130 and 132 in the cover 114 becomes extremely difficult.

Then, in the present embodiment, a substantially quadrangular notch is provided at part of the partition wall 124, and a thermally insulating member 126 that is of a substantially identical shape to the notch and that has two through holes 126a is fitted into the notch of the partition wall 124. The thermally insulating member 126 has the lead wires 130 and 132 inserted into its two through holes 126a, and then is attached to the bottom plate 102. Note that, a bush 134 is attached to each of the two through holes 126a, whereby the thermal insulation performance of the thermally insulating member 126 is improved.

With this structure, it becomes possible to attach all the components except for the cover 114 to the bottom plate 102, then arrange the lead wires 130 and 132, and thereafter attach the cover 114 to the bottom plate 102. Thus, this structure is advantageous in workability.

Note that, it is preferable to apply, for example, an adhesive agent or the like, around the thermally insulating member 126, and to bring the thermally insulating member 126 in close contact with the partition wall 124.

Further, the partition wall 124 can be structured as a double structure having an air layer interposed. The partition wall of the double structure is further excellent in the thermal insulation performance.

Here, referring further to FIG. 4, when the distance from the top face of the bottom plate 102 to the top end of the power transmitting coil 112 is D1 (≅h1+t1+t2), and the distance from the top face of the bottom plate 102 to the bottom face of the first top wall 114a of the cover 114 is D2, distance D2 is set to be greater than distance D1 (D2>D1). That is, between the power transmitting coil 112 and the cover 114, a gap of a prescribed height (D2–D1) is formed. Preferably, the height of the gap is evenly set. The gap is provided as an air layer.

Further, the total height of the thermally conductive member 104, the coil base 106, the ferrite 108, the mica plate 110, and the power transmitting coil 112 is different from the height of the electronic component group 116. Therefore, the distance from the bottom plate 102 to the first top face 114a and the distance from the bottom plate 102 to the second top face 114b are set to be different from each other. Note that, in the example of FIG. 4, the height of the first top face 114a is set to be higher than that of the second top face 114b.

In some cases, the contactless power supply device 100 having such a structure is shallowly buried in a parking space. In other cases, the contactless power supply device 100 itself is movably structured. In any of the cases, it is disposed such that the power transmitting coil 112 and the electronic component group 116 are juxtaposed to each other along the traveling direction of the electrically propelled vehicle 400. At this time, since the height of the first top face 114a of the cover 114 and that of the second top face 114b are different from each other, the front side and back side of the power supply device 100 (i.e., orientation) can instantaneously be discerned between each other. Thus, the power supply device 100 can be attached with ease.

After the installation, the power receiving device 200 mounted on the electrically propelled vehicle 400 (see FIG. 1) and the power supply device 100 are positioned to oppose to each other having an air gap interposed between them. In the state where the power supply device 100 and the power receiving device 200 are positioned as described above, electric power is transmitted in a contactless manner from the power supply device 100 to the power receiving device 200.

Note that, the power supply device 100 is installed such that the bottom plate 102 is directed downward, irrespective of the power supply device 100 being buried or movable. Accordingly, when the power supply device 100 is movable, a person may unintentionally touch the cover 114. Further, even when the power supply device 100 is buried, it cannot be buried very deep. In some cases, the cover 114 may be exposed. Accordingly, measures for dissipating Joule heat become important.

Accordingly, in the present embodiment, the air layer exhibiting the heat insulating effect is provided between the power transmitting coil 112 and the cover 114. The air layer suppresses Joule heat from being transferred from the power transmitting coil 112 to the cover 114 which may possibly be touched by a person, in particular, to the top panel portion (first top wall) 114a. That is, it becomes possible to provide the power supply device 100 that can suppress overheat of the cover 114.

Note that, it is also possible to cause a thermally insulating member being lower in thermal conductivity than air to be interposed into the air layer between the power transmitting coil 112 and the cover 114. Provision of the thermally insulating member being lower in thermal conductivity than air in place of the air layer realizes further reduction of transfer of Joule heat from the power transmitting coil 112 to the cover 114.

Further, as described above, the thermally conductive member 104 is greater in thermal conductivity than the air. In the case where an air layer is present at the portion of the thermally conductive member 104, the air shifts upward by convection when the air is heated. Therefore, the hot temperature portion exists at an upper portion of the air layer, and downward heat migration cannot be expected. However, provision of a solid higher in thermal conductivity than air realizes heat migration by thermal conduction only, with no directivity of heat migration. Thus, heat can efficiently be guided downward. In this manner, Joule heat generated by the power transmitting coil 112 is transferred to the bottom plate 102 via the thermally conductive member 104, and dissipated. More specifically, in the case where the power supply device 100 is placed on an installation face such as the ground, heat is transferred from the bottom plate 102 to the installation face and dissipated. Note that, when an air layer (clearance) is interposed between the bottom plate 102 and the installation face, heat is dissipated from the bottom plate 102 to the air layer. In other words, it becomes possible to further suppress Joule heat from being transferred to the top panel (first top wall) 114a.

Further, since the distance between the top end of the power transmitting coil 112 and the bottom face of the first top wall 114a is evenly set, Joule heat can evenly be transferred to the first top wall 114a, and it becomes possible to prevent the temperature of the first top wall 114a from being locally increased.

Further, as described above, Joule heat generated by the power transmitting coil 112 is blocked by the partition wall 124 exhibiting the thermal insulation performance, and thus can be prevented from being transferred to the electronic component group 116. Thus, according to the present embodiment, the contactless power supply device that can suppress overheat of the electronic components can be provided.

INDUSTRIAL APPLICABILITY

Since the contactless power supply device according to the present invention can suppress overheat of each part (e.g., the cover, the electronic components and the like), it is suitable for charging an electrically propelled vehicle, for example.

EXPLANATION OF REFERENCE NUMERALS

100: CONTACTLESS POWER SUPPLY DEVICE
102: BOTTOM PLATE
104: THERMALLY CONDUCTIVE MEMBER
106: COIL BASE
108: FERRITE
110: MICA PLATE
112: POWER TRANSMITTING COIL
114: COVER
114a: FIRST TOP WALL
114b: SECOND TOP WALL
114c: SIDEWALL
116: ELECTRONIC COMPONENT GROUP
118: DIVIDING WALL
120: COIL HOLDER
122: SHIELD MEMBER
124: PARTITION WALL
126: THERMALLY INSULATING MEMBER
126a: THROUGH HOLE
130, 132: LEAD WIRE
134: BUSH
200: POWER RECEIVING DEVICE
400: ELECTRICALLY PROPELLED VEHICLE
S: CONTACTLESS POWER SUPPLY SYSTEM

The invention claimed is:

1. A contactless power supply device supplying electric power in a contactless manner to a power receiving device mounted on a moving object, comprising:

a bottom plate having an installation face;
a power transmitting coil which supplies electric power to a power receiving coil included in the power receiving device, the power transmitting coil being disposed on the bottom plate;
a cover attached to the bottom plate so as to cover the power transmitting coil; and
an electronic component which is disposed on the bottom plate, the electronic component being connected to the power transmitting coil,
wherein an air layer is formed between the power transmitting coil and the cover,
the cover further covers the electronic component,
the contactless power supply device further comprises a partition wall which divides a space surrounded by the bottom plate and the cover into a first storage space and a second storage space, the first storage space storing the power transmitting coil and the second storage space storing the electronic component,
a height of a second top face of the cover which corresponds to the second storage space with reference to the bottom plate is lower than a height of a first top face of the cover which corresponds to the first storage space with reference to the bottom plate, and
the partition wall has a thermal insulating characteristic such that Joule heat generated by the power transmitting coil is blocked by the partition wall so as to prevent Joule heat from being transferred to the electronic component.

2. The contactless power supply device according to claim 1, wherein a thermally conductive member higher in thermal conductivity than air is provided between the bottom plate and the power transmitting coil.

3. The contactless power supply device according to claim 2, wherein the thermally conductive member is formed of ceramic or resin.

4. The contactless power supply device according to claim 1, wherein a thermally insulating member lower in thermal conductivity than air is interposed into the air layer between the power transmitting coil and the cover.

5. The contactless power supply device according to claim 1, wherein the moving object is an electrically propelled vehicle.

6. The contactless power supply device according to claim 1, wherein the second storage space is provided to one of a front direction and a rear direction of the moving object with reference to the first storage space.

7. The contactless power supply device according to claim 1, wherein the partition wall is integrally formed with the cover so as to extend from the cover to the bottom plate.

8. The contactless power supply device according to claim 1, wherein the partition wall has a notch, the contactless power supply device further comprises a thermally insulating member which fits with the notch and that has a plurality of through holes, and
into the through holes, a lead wire connected to one end of the power transmitting coil and a lead wire connected to other end of the power transmitting coil are inserted.

9. A contactless power supply device supplying electric power in a contactless manner to a power receiving device mounted on a moving object, comprising:
a bottom plate having an installation face;
a power transmitting coil which supplies electric power in the contactless manner to the power receiving device, the power transmitting coil being disposed on the bottom plate;
an electronic component which is disposed on the bottom plate, the electronic component being connected to the power transmitting coil; and
a cover attached to the bottom plate so as to cover the power transmitting coil and the electronic component,
wherein the contactless power supply device further comprises a partition wall which divides a space surrounded by the bottom plate and the cover into a first storage space and a second storage space, the first storage space storing the power transmitting coil and the second storage space storing the electronic component,
a height of a second top face of the cover which corresponds to the second storage space with reference to the bottom plate is lower than a height of a first top face of the cover which corresponds to the first storage space with reference to the bottom plate, and
the partition wall has a thermal insulating characteristic such that Joule heat generated by the power transmitting coil is blocked by the partition wall so as to prevent Joule heat from being transferred to the electronic component.

10. The contactless power supply device according to claim 9, wherein the second storage space is provided to one of a front direction and a rear direction of the moving object with reference to the first storage space.

11. The contactless power supply device according to claim 9, wherein the partition wall is integrally formed with the cover so as to extend from the cover to the bottom plate.

12. The contactless power supply device according to claim 9, wherein the partition wall has a notch, the contactless power supply device further comprises a thermally insulating member that fits with the notch and that has a plurality of through holes, and
into the through holes, a lead wire connected to one end of the power transmitting coil and a lead wire connected to other end of the power transmitting coil are inserted.

13. The contactless power supply device according to claim 1, wherein the partition wall has a double structure having an air layer interposed.

14. The contactless power supply device according to claim 9, wherein the partition wall has a double structure having an air layer interposed.

15. The contactless power supply device according to claim 1, wherein the partition wall has the thermal insulating characteristic higher than a thermal insulating characteristic of the cover.

16. The contactless power supply device according to claim 9, wherein the partition wall has the thermal insulating characteristic higher than a thermal insulating characteristic of the cover.

* * * * *